United States Patent
Hartogh et al.

(10) Patent No.: US 11,841,016 B2
(45) Date of Patent: Dec. 12, 2023

(54) ROTOR FOR AN ECCENTRIC SCREW PUMP AND METHOD FOR THE MANUFACTURE THEREOF

(71) Applicant: VOGELSANG GMBH & CO. KG, Essen (DE)

(72) Inventors: Peter Hartogh, Essen (DE); Michael Rolfes, Essen (DE); Hugo Vogelsang, Essen (DE)

(73) Assignee: VOGELSANG GMBH & CO KG, Essen (DE)

( * ) Notice: Subject to any disclaimer, the term of this patent is extended or adjusted under 35 U.S.C. 154(b) by 124 days.

(21) Appl. No.: 17/260,417

(22) PCT Filed: Jul. 18, 2019

(86) PCT No.: PCT/EP2019/069446
§ 371 (c)(1),
(2) Date: Jan. 14, 2021

(87) PCT Pub. No.: WO2020/016386
PCT Pub. Date: Jan. 23, 2020

(65) Prior Publication Data
US 2021/0301817 A1    Sep. 30, 2021

(30) Foreign Application Priority Data
Jul. 18, 2018   (DE) ..................... 20 2018 104 142.8

(51) Int. Cl.
*B23C 3/02*      (2006.01)
*F04C 2/107*   (2006.01)
*B23C 3/08*      (2006.01)

(52) U.S. Cl.
CPC ................ *F04C 2/107* (2013.01); *B23C 3/08* (2013.01); *B23C 2220/00* (2013.01);
(Continued)

(58) Field of Classification Search
CPC .... B23C 3/08; B23C 3/02; B23C 3/04; B23C 3/06; B23C 2220/08; B23C 2220/64; B23C 2220/68; B23C 2220/48
See application file for complete search history.

(56) References Cited

U.S. PATENT DOCUMENTS

| 2,720,130 A | 10/1955 | Chang |
| 5,765,270 A | 6/1998 | Schrod |

(Continued)

FOREIGN PATENT DOCUMENTS

| AT | 301297 | 8/1972 |
| CN | 1421613 | 6/2003 |

(Continued)

*Primary Examiner* — Alan Snyder
(74) *Attorney, Agent, or Firm* — PRICE HENEVELD LLP

(57) ABSTRACT

A method of manufacturing a metallic rotor of an eccentric screw pump, comprising clamping a workpiece extending along a central longitudinal axis in a workpiece clamping device and removing material from the workpiece by cutting with a cutting tool. The invention further comprises not producing the surface of the rotor in a three-axis whirling process, using the cutting tool to produce the outer surface geometry of the rotor, advancing the cutting tool along an axis of advance that is parallel to the longitudinal axis of the rotor, and rotating the cutting tool about an axis of tool rotation that is parallel to the longitudinal axis of the rotor.

1 Claim, 6 Drawing Sheets

(52) U.S. Cl.
    CPC .... *B23C 2220/48* (2013.01); *F04C 2230/103* (2013.01); *F04C 2230/22* (2013.01); *F04C 2240/10* (2013.01); *F04C 2240/20* (2013.01)

(56) References Cited

U.S. PATENT DOCUMENTS

| | | | |
|---|---|---|---|
| 6,322,300 | B1 * | 11/2001 | Santorius .............. B23C 3/06 409/199 |
| 2011/0305589 | A1 | 2/2011 | Raether |
| 2016/0327037 | A1 | 11/2016 | Rothschild et al. |
| 2017/0314551 | A1 | 11/2017 | Sakakihara et al. |
| 2018/0172041 | A1 | 6/2018 | Boyer et al. |

FOREIGN PATENT DOCUMENTS

| | | |
|---|---|---|
| CN | 1570396 | 1/2005 |
| CN | 103883522 | 6/2014 |
| CN | 106640627 | 5/2017 |
| CN | 107263019 | 10/2017 |
| CN | 107571022 | 1/2018 |
| CN | 107766647 | 3/2018 |
| DE | 19749939 | 5/1999 |
| DE | 19806608 | 9/1999 |
| DE | 10345597 | 5/2005 |
| EP | 0634236 | 1/1995 |
| EP | 2063125 | 5/2009 |
| EP | 2952275 | 12/2015 |
| JP | S6229781 | 2/1987 |
| JP | 2001522726 | 11/2001 |
| JP | 2002-227821 | 8/2002 |
| JP | 2006263868 | 10/2006 |
| JP | 2014-62535 | 4/2014 |
| JP | 5711865 | 5/2015 |
| JP | 2015135097 | 7/2015 |
| JP | 2016-94907 | 5/2016 |
| KR | 10200000005327 | 1/2000 |
| SU | 1741981 | 6/1992 |
| WO | 2015021515 | 2/2015 |
| WO | 2018091923 | 5/2018 |

* cited by examiner

ROTOR FOR AN ECCENTRIC SCREW PUMP AND METHOD FOR THE MANUFACTURE THEREOF

CROSS-REFERENCE TO FOREIGN PRIORITY APPLICATION

The present application claims the benefit under 35 U.S.C. §§ 119(b), 119(e), 120, and/or 365(c) of PCT/EP2019/069446 filed Jul. 18, 2019, which claims priority to German Application No. 20 2018 104 142.8 filed Jul. 18, 2018.

FIELD OF THE INVENTION

The invention relates to a method of manufacturing a rotor of an eccentric screw pump.

BACKGROUND OF THE INVENTION

Eccentric screw pumps (alias progressive cavity pumps) are used for pumping liquid media, they are particularly well suited for pumping pasty media or liquid, particle-laden media. They work according to the principle of a positive displacement pump.

Known eccentric screw pumps are made up of a stator, which has an internal cavity in which a rotor is arranged. Stator and rotor extend along a longitudinal axis. A cavity is formed in the stator with an internal geometry shaped in the manner of a multiple internal thread, which forms the stator interior. The rotor has a worm-shaped outer contour shaped in the manner of a single- or multiple external thread. The number of threads of the rotor is lower, typically by one, than the number of threads of the internal geometry of the stator interior.

The rotor performs a movement in the stator interior which is composed of a rotational movement of the rotor about its central longitudinal axis and a rotational movement of the central longitudinal axis of the rotor about a central longitudinal axis of the stator superimposed on this rotational movement. The central longitudinal axis of the rotor moves with an eccentricity around the central longitudinal axis of the stator. The rotor is, therefore, typically driven by means of a wobble shaft formed by two spaced cardan joints connected by a wobbling axle section. For smaller eccentricities, this wobble shaft can also be formed by a flexible shaft coupled between the drive motor and the rotor in a torque-resistant manner.

The geometry of the rotor can be formed in the manner of a single- or multi-thread worm. In this case, the worm thread with a central worm axis located in the centre of the cross section of the worm thread runs in a winding path at a distance, which represents the eccentricity, around the central longitudinal axis of the rotor.

Due to this eccentric geometry, the rotor cannot be economically produced in a conventional machining process on a turning lathe. Instead, primary forming processes such as casting or forging provide the necessary shaping freedom to produce the three-dimensional geometric contour of a rotor, but these primary forming processes typically require post-machining of the surface to achieve the required geometric precision and are, therefore, also not an economically efficient manufacturing process for rotors of eccentric screw pumps.

Therefore, nowadays such rotors are manufactured in a whirling process. When manufacturing by means of a whirling process, a cutting edge or several cutting edges are guided on a tool that rotates relatively around the central longitudinal axis of the rotor. The cutting edges, therefore, move on a circular path around the central longitudinal axis of the rotor and produce a cutting effect with their radially inwardly directed cutting edges. The circular path is eccentric to the central longitudinal axis. The tool is superimposed on this rotational movement along the central longitudinal axis of the rotor during the manufacturing process. By providing a rotational movement of the rotor around the central longitudinal axis that is synchronous with this it is possible to efficiently produce the eccentrically running screw geometry of the rotor in such whirling process.

In principle, the whirling process is an efficient manufacturing method for rotors, but it has disadvantages that could be improved. For example, restarting the process in the event of a tool breakage is only possible with a great deal of effort in such a way that the desired outer contour of the rotor remains geometrically error-free, i.e., within the required tolerances. As a result, tool wear and the existing risk of tool breakage lead to early preventive replacement of the tool in the whirling process, which makes the manufacturing process maintenance-intensive and production more expensive. The complex coordination of the rotary motion of the rotor and the rotary motion and axial motion of the whirling tool, which has to be realised in terms of control technology, requires complex production planning, which is sensitive to production interruptions in the event of irregularities in the production sequence.

Against this background, the invention is based on the task of providing a manufacturing process for rotors of eccentric screw pumps that reduces or overcomes these disadvantages.

SUMMARY OF THE INVENTION

This task is solved by not producing the surface of the rotor in a three-axis whirling process in which the cutting tool is used to produce the outer surface geometry of the rotor by advancing the cutting tool along an axis of advance that is parallel to the longitudinal axis of the rotor and rotating the cutting tool about an axis of tool rotation that is parallel to the longitudinal axis of the rotor.

The invention thus turns away from the known whirling process. It proposes to use other manufacturing processes for manufacturing a rotor of an eccentric screw pump. This can be, for example, another cutting manufacturing process, such as a milling process. However, this may also be an additive manufacturing process in which the rotor is built up layer by layer or section by section from a curable material in a selectively applying or selectively curing process. In particular, it is preferred to neither manufacture the rotor in a primary moulding process, which requires mould construction as a preliminary step, nor in a forging process or a casting process such as an injection moulding process.

Another aspect of the invention is a method of manufacturing a rotor of a eccentric screw pump, comprising the steps of: clamping a workpiece extending along a central longitudinal axis in a workpiece clamping device, removing material from the workpiece by cutting with a cutting tool, wherein a milling tool is used as the cutting tool and the rotor is manufactured in a milling process.

According to the invention, the preferably metallic rotor according to this aspect is machined in the manufacturing process by a milling process. A milling tool is used for this purpose. A milling tool or milling process is characterised in that one or more cutting edges of the milling tool rotate about a tool rotation axis during the milling process, wherein the cutting edges project radially outwards with respect to this tool rotation axis and/or project axially with respect to the tool rotation axis. In contrast, in the whirling process, the cutting edges of the tool project radially inwards with respect to the axis of rotation of the whirling tool.

According to the invention, the rotor is, therefore, not manufactured in a whirling process, but in a milling process. A whirling process is understood to be a cutting machining process in which the cutting edge of the cutting tool traverses a path of movement that circumscribes the workpiece, thereby completely circumscribing the workpiece, and the cutting takes place geometrically between the tool rotation axis and the cutting edge, with the cutting direction being directed radially inwards with respect to the tool rotation axis. In contrast, in a milling process, the cutting edge moves on a convex or planar path of movement and the cutting edge is arranged between the location of the cutting contact and the tool rotation axis, whereby the cutting direction is directed radially outwards with respect to the tool rotation axis.

In the whirling process, the workpiece is inside the path of motion, i.e., enclosed by the path of motion, in relation to the path of motion of the cutting edge, whereas in the milling process it is outside the path of motion. By using a milling process, it is possible to restart the process and finish the rotor within the tolerance range without geometric errors even if the manufacturing process is interrupted, for example, due to machine failure, tool breakage, interruption of the coolant or lubricant supply, or the like. This is achieved by the fact that the manufacturing process can be precisely restarted at any geometric point of the manufacturing process and at any time of the manufacturing process due to the traversability of the milling tool. In particular, the precise restartability of a position of the milling tool on the workpiece therefore allows to significantly reduce the scrap that can result from such unexpected incidents. The milling process allows different milling tools to be used during the production of a rotor. For example, a roughing tool that has a high cutting capacity can first be used to create the rough shape contour of the rotor, and the roughing tool can be used to produce the contour of the rotor with a small machining allowance. After this, the final contour of the rotor can be produced with a high surface quality using a finishing tool that has a lower cutting capacity with a higher precision. Likewise, a correspondingly small milling tool can be used for smaller contours of the rotor, for example, lubrication pockets.

Another advantage of the milling process is the better and more economical tool utilisation. A milling tool can be used up to just before its wear limit, as any failure of the tool does not have such serious consequential damage as a tool failure in the whirling process.

The milling process can be designed in such a way that the milling tool is movable in one, two, or three axes. The mobility of the milling tool around an axis is to be understood as the possibility to move the milling tool along an axis or to swivel it around an axis. The rotation of the milling tool about the tool axis itself is not understood here as movability about an axis. Alternatively or in addition to the movability of the milling tool during the milling process, the rotor can also be movable about one, two, or more axes. Again, it is to be understood that the rotor can be moved along an axis or can be pivoted or rotated about an axis. In particular, in the manufacturing process according to the invention, a superposition of a movement of the milling tool and a movement of the rotor can take place, for example, by moving the milling tool along the longitudinal axis of the rotor during the milling process, rotating the rotor about the central longitudinal axis of the rotor or an axis offset therefrom, for example, parallel thereto, and moving the milling tool during the milling process in an axial direction which is radial or perpendicular to the longitudinal axis of the rotor. In particular, this axis, which is radial or perpendicular to the longitudinal axis of the rotor, can correspond to the tool rotation axis.

It should be understood that in the case of manufacturing conical rotors, the cutting tool is advanced along a feed axis that is non-parallel to the longitudinal axis of the rotor. However, when manufacturing conical rotors, the feed axis is parallel to an enveloping surface of the rotor at the point of machining. In this respect, for the milling production of conical rotors in the following description, a feed parallel to the enveloping surface shall apply accordingly at the points where a feed parallel to the longitudinal axis is mentioned.

According to a first preferred embodiment, it is provided that the milling tool rotates about a tool rotation axis that is not parallel to the centre longitudinal axis of the workpiece during the cutting removal of the material.

In contrast to the whirling process, in which the axis of rotation of the whirling tool must be parallel to the central longitudinal axis of the workpiece or the central longitudinal axis of the rotor in order to produce a rotor, the milling process allows the axis of rotation of the milling tool to be aligned in an angular position that deviates from this. The tool rotation axis can, for example, be perpendicular to the central longitudinal axis of the workpiece, i.e., in particular, radially in relation to the longitudinal axis of the rotor to be produced. It should be understood that the tool rotation axis and the central longitudinal axis of the workpiece do not have to intersect at one point, but can also be offset from each other in such a way that they run at a distance from each other. In particular, the tool rotation axis can also change its position relative to the central longitudinal axis of the workpiece during the milling process according to the invention by pivoting the milling tool or the workpiece relative to each other during the milling process. This can also mean that the milling tool temporarily rotates about a tool rotation axis that is parallel to the longitudinal centre axis of the workpiece.

According to another preferred embodiment, it is provided that the milling tool rotates about a tool rotation axis during the machining removal of the material and is advanced relative to the workpiece in a tool feed direction that is not parallel to the tool rotation axis.

By rotating the milling tool around the tool rotation axis and advancing the milling tool in a tool feed direction that is not parallel to the tool rotation axis, material removal can be efficiently achieved by the cutting edges arranged circumferentially on the milling tool. This is another significant difference between the milling process and the whirling process, in which the tool is advanced parallel to its tool rotation axis to effect the cutting. It should be understood that tool feed direction means the actual relative movement of the tool to the workpiece, i.e., not a directional component of this relative movement. Tool feed directions that only contain a directional component that is parallel to the tool rotation axis, but also have at least other directional components that are not parallel to the tool rotation axis, are included in the embodiment. In particular, it can be provided that the tool feed direction is parallel and/or perpendicular to the central longitudinal axis of the workpiece. By means of this feed direction, on the one hand, machining of the workpiece along its entire length by the milling tool can be achieved, and on the other hand, a desired production of a thread geometry or a screw geometry can be effected by the feed direction of the milling tool perpendicular to the central longitudinal axis. It should be understood that the tool feed direction parallel and perpendicular to the central longitudinal axis can also be executed as a combined movement, i.e., as a movement that has a component parallel to the central longitudinal axis of the workpiece and a component perpendicular to the central longitudinal axis of the workpiece. Similarly, a time-delayed combined movement of the tool can be carried out by first moving the tool in a tool feed direction parallel to the longitudinal centre axis of the workpiece and then moving the milling tool in a tool feed direction perpendicular to the longitudinal centre axis of the workpiece.

When using an end mill with only the peripheral cutting edges engaged, it is advantageous to achieve higher feed rates than when using a axial end face of an end mill. This is because of the higher cutting speeds at the periphery compared to a centre of the cutter and the ability to design the peripheral cutting edges to be more stable. Preferably, no axial end face cutting is performed.

In principle, it should be understood in the above embodiments that although the milling tool is preferably moved and the rotor is not advanced in the process, what is important for the function of the invention is a relative translatory movement of the milling tool in relation to the rotor, which can also be realised by a translatory displacement of the rotor in the case of a milling tool that is not moving but only rotating, or by a superimposed translatory movement of the milling tool and rotor.

According to a further preferred embodiment, it is preferred that the workpiece rotates about its central longitudinal axis during the machining removal of the material. By rotating the workpiece about the central longitudinal axis, a further degree of freedom in the control of the milling process can be effected with a particularly precise and reapproachable positioning. In particular, such a rotating movement of the workpiece in conjunction with a translatory relative movement between the workpiece and the milling tool enables the production of a threaded structure or worm structure and this can achieve a high degree of geometric freedom for the production of complex worm geometries, or thread geometries of a rotor, in particular, with an additional superimposed infeed in a direction perpendicular to the axis of rotation of the workpiece, in particular, in a radial direction with respect to the longitudinal axis of the workpiece. The milling tool is preferably guided tangentially to the desired geometry of the workpiece.

According to the invention, it is advantageous to use the method on the one hand to manufacture an eccentric screw rotor and to manufacture its geometry either on the basis of a previously determined geometry of an eccentric screw stator or to determine the geometry of an eccentric screw stator on the basis of the geometry of the eccentric screw rotor and to manufacture it. In this way, the number of threads of the stator and the rotor, the pitch, any conicity, and any eccentricity can be precisely matched to one another in such a way that a low-friction and efficiently sealing eccentric-rotating running of the rotor in the stator is achieved.

It is advantageous for the process according to the invention if the milling tool runs sideways of the workpiece and not on top of the workpiece. In this arrangement, the cutting ablation takes place—preferably exclusively—with the lateral surface of the milling tool, which can, in particular, be designed as a cylindrical lateral surface. The machining of the silhouette of the rotor to be produced in this way—instead of the known line-by-line scanning of the geometry with a milling tool guided on the workpiece—achieves a precise generation of both the pressure-side and the suction-side flank of a screw thread without steps in the longitudinal direction of the workpiece. This is a relevant quality criterion for eccentric screw pumps, since here—in contrast to a normal screw pump, for example, in which a feed screw runs in a round tube and only the envelope of the entire feed screw has to be designed to fit the round tube—the threads of the stator and the threads of the rotor have to mesh for the function.

Thus, with this manufacturing method, when the top view of the eccentric rotor is projected into a plane in the direction of the tool rotation axis, the projected milling tool does not penetrate the body but travels around the projected outer contour while the eccentric rotor rotates around its longitudinal axis. In contrast, in the conventional whirling process and in conventional CAM processes, the tool is guided in such a way that the cutting edges run for the most part inside the projected body.

In addition, the method according to the invention can be carried out in such a way that the outer surface of the eccentric rotor is machined with an axial feed movement of the milling tool running back and forth several times from one end to the other end of the workpiece along the longitudinal axis of the workpiece, and a rotary movement of the workpiece about its longitudinal axis is superimposed. In this context, a feed movement along the longitudinal axis of the tool is to be understood as a movement running in the longitudinal direction of the workpiece along the envelope, which in the case of rotors with a constant diameter of the envelope along the longitudinal axis can run parallel to this longitudinal axis, but in the case of rotors with a diameter changing conically in the longitudinal direction, for example, a conically tapering envelope, can also run slightly inclined to the longitudinal axis. This achieves a continuous surface that is free of discontinuities or steps along each surface line extending in the longitudinal direction and only has a slight segmentation in the circumferential direction—depending on the feed fineness. Such a surface is advantageous for low-wear, long-life running for the intermeshing function of rotor and stator of an eccentric screw pump. In contrast, a surface milled by line-by-line scanning of the contour with a circumferential (tangential) feed direction of the milling tool, i.e., in which first the complete pressure-side surface of a flank and then the complete suction-side surface of a flank is milled, leads to a surface that is unsuitable for eccentric screw pumps at economically feasible feed rates, since discontinuities acting as cutting edges are generated on the rotor, which would lead to short-term wear/immediate damage to the stator.

According to a further preferred embodiment, it is provided that the milling tool is fed in a radial direction with respect to the central longitudinal axis during the cutting removal of the material. By feeding in the milling tool in a radial direction with respect to the central longitudinal axis, it is possible to give the rotor produced by the milling process a surface which has a different radius with respect to this central longitudinal axis, whereby the worm geometry of the rotor can be produced. Radial infeed is to be understood as an infeed with a relative movement between tool and workpiece with a radial directional component with respect to the central longitudinal axis, but the relative movement can also have other directional components, for example, axial or tangential directional components. The infeed can be effected by infeeding the milling tool itself, but the longitudinal centre axis of the rotor can also be offset in the radial direction, for example, by rotating the rotor about an axis offset from the longitudinal centre axis so that the longitudinal centre axis is eccentric. The infeed may be parallel to the tool rotation axis with respect to this tool rotation axis, for a tool rotation axis that is perpendicular to the longitudinal centre axis of the rotor. With a different orientation of the tool rotation axis or with a tool rotation axis that is perpendicular to the centre longitudinal axis and does not intersect the centre longitudinal axis, the infeed can also take place in radial direction to the tool rotation axis. The infeed movement in a radial direction with respect to the centre longitudinal axis of the rotor is to be understood as also being able to take place along an axis parallel to such radial direction to the centre longitudinal axis. This means that the infeed movement does not have to take place along an axis that intersects the central longitudinal axis, but can also take place along an axis that is parallel to an axis that intersects the central longitudinal axis, i.e., runs past the central longitudinal axis in an offset manner.

Preferably, the milling tool is an end mill and/or face mill, and preferably only the cutting edges arranged circumferentially on the milling tool are used for machining removal of the material during machining. The process is preferably carried out in this way at least when the radial outer surface of the rotor is machined. This results in special advantages already mentioned above. With the current state of milling technology, a rotor cannot be produced economically. With standard milling methods, it is necessary to use additional software, such as CAM programs, which results in long internal processing times. Furthermore, the known milling in the cutting process is not economical, since less contact surface leads to longer processing times. In particular, only smaller feed rates are possible. If the face of a face milling cutter or end milling cutter is used, the cutting speeds towards the centre of rotation are lower than at the periphery. This means that only lower feed rates can be achieved. In addition, the tool life of a face milling cutter that is engaged with its face is shorter. In addition, an uneven surface of the tool is in engagement ("plunging" and "rising"). Therefore, in the prior art, a special type of milling tool was necessary, such as a ball cutter.

Above all, the methods known in the prior art were not economical for the rotors of an eccentric screw pump, since during operation of an eccentric screw pump all surfaces of the rotor are in engagement with the stator and a corresponding surface quality and accuracy is necessary. In addition, the rotor of an eccentric screw pump is a wearing part, which is why it is necessary to produce large quantities. These economic demands cannot be met with conventional milling processes.

Something different arises, in particular, with a rotor being a screw of an extruder or conveyor. Here, for example, the back side (seen in the conveying direction) of the individual threads only needs to be roughly accurate. In addition, extruder screws are not common wearing parts (compared to a conveying element of a positive displacement pump such as, in particular, the eccentric screw pump), so that here the demands on the economic efficiency of the process are not so high.

It is even more preferred if a rotor serving as a stator core for a subsequent stator production is produced and a stator is subsequently produced by means of the stator core in a master moulding process, wherein during the moulding process the stator core serves to define the geometry of the inner geometry of the stator. According to this embodiment, the process according to the invention produces a rotor which serves as a stator core, i.e., which has an outer geometry which corresponds to an inner geometry of a stator to be produced therefrom. Here, if necessary, allowances or deductions are to be taken into account during production, which take into account and compensate for shrinkage effects or expansion effects in the original moulding process used later. In particular, it is advantageous to manufacture the stator core by the milling process, because this makes it possible to manufacture a stator which, like the previously explained rotor manufactured by the milling process, can be provided with a specific internal geometry by changing one or more geometric parameters along the axial longitudinal extension, which interacts functionally with a rotor which also has a change in one or more geometric parameters in the axial direction. In this context, a moulding process is understood to be, for example, a casting process, a forging process or a laminating process such as a winding process.

Another aspect of the invention is a method of manufacturing a metallic rotor of an eccentric screw pump, wherein the rotor is manufactured in an additive manufacturing process, in particular, by a laser sintering process or a laser melting process, wherein a selective material deposition process or a selective material curing process is controlled based on the geometric data of the rotor.

Another aspect of the invention is a method of manufacturing a stator core for a stator of an eccentric screw pump, wherein the stator core is manufactured by an additive manufacturing process in which a selective material deposition process or a selective material curing process is controlled based on geometric data of the stator core.

According to these two aspects, an additive manufacturing process is used instead of a machining, i.e., subtractive, manufacturing process in which material is selectively removed from an initial semi-finished product in order to produce a final geometry of the rotor or stator core. Additive manufacturing processes are moulding processes in which material is selectively applied or cured in sections, and this selective process is controlled using geometric data of the product to be manufactured. Such additive manufacturing processes have been developed and used since the Nineties, initially for the production of prototypes, but in the meantime they can also be used to produce individual end products and small or medium quantities of series products from many different materials. Often, a base material, such as powder or a liquid, is applied in layers and certain areas within the layer are selectively hardened, for example, by exposure to electromagnetic radiation or by selective application of a curing material, followed by irradiation if necessary. In this way, a product can be produced layer by layer by repeated superimposed layer application. Uncured material is then subsequently removed and can often be reused. In other variants of additive manufacturing processes, a material is selectively applied in portions and the portions are bonded together and cured portion-wise.

Still further, it is preferred that the method according to the invention is improved in that the rotor or stator core extends from a first end along the central longitudinal axis to a second end, and in that a geometry of the rotor or stator core generated in the additive manufacturing process of the rotor or stator core is a worm geometry which is defined by geometric parameters eccentricity of the worm thread, defined as the distance between a central worm axis running in the centre of the worm cross-sectional area and the centre longitudinal axis, surrounding outer diameter of the worm in relation to the central longitudinal axis, enveloping inner diameter of the worm in relation to the central longitudinal axis, outer diameter of the worm in relation to the central worm axis, and pitch of the central worm axis, wherein the milling tool is guided by the electronic control during the cutting removal of the material or the selective material application process or the selective material curing process of the additive manufacturing process is controlled such that at least one of the geometric parameters is changed along the longitudinal axis of the rotor or stator core, in particular, at the first end of the rotor or stator core said geometric parameter is greater than at the second end of the rotor or stator core, or at one end of the rotor or stator core said geometric parameter is different from a cross section of the rotor or stator core lying in the axial direction between the first and second ends.

Basically, the rotor of an eccentric screw pump is characterised by certain geometric parameters. The eccentricity of the worm thread is the distance between the central worm axis, which extends sinuously through the rotor, and the central longitudinal axis of the rotor, which runs in a straight line. The enveloping outer geometry is defined as the enveloping outer diameter, which is typically understood to be a cylinder enveloping the worm. The inner geometry of the worm facing the central longitudinal axis is defined as an enveloping inner diameter which, when the thickness of the worm is not greater than twice the eccentricity, can be understood as an inner cylinder space actually enveloped by the worm, but when the worm thickness is half the eccentricity, can be understood as an inscribed cylinder defined by the helical boundary line of the rotor closest to the central longitudinal axis. The pitch of the rotor is to be understood as the pitch of the central worm axis and is to be understood, for example, by the distance between two adjacent points on the central worm axis which intersect a plane in which the central longitudinal axis lies on the same side to the central longitudinal axis. The greater this distance, the greater the pitch of the rotor or the central worm axis.

In known rotors, especially in rotors manufactured by the whirling process, these geometric parameters are typically constant over the entire axial extension of the rotor, i.e., the rotor has the same eccentricity, the same screw thickness, the same maximum outer diameter, and the same minimum inner diameter as well as the same pitch from the rotor start to the rotor end. A rotor manufactured in this way, in which the geometric parameters are constant along the longitudinal axis of the rotor, can be understood as a reference profile.

The manufacture of the rotor by milling or additive manufacturing process, in contrast to the whirling process, allows greater freedom in the geometric design of the rotor, including a change of one or more of these geometric parameters during the manufacturing process of a rotor. In this way, one or more of the geometric parameters can be changed along the central longitudinal axis of the rotor, such that in a first cross-sectional region of the rotor the geometric parameter has a first value and in a second cross-sectional region of the rotor axially spaced therefrom the geometric parameter has a second value different from the first value. A rotor manufactured in this way, therefore, has a deviation from the reference profile in one or more sections or overall.

In this way, for example, a conical rotor can be produced, by which is meant, for example, a rotor having an enveloping outer diameter decreasing from a first end to a second end of the rotor, which can be achieved, for example, by an eccentricity decreasing from the first end to the second end while the cross-sectional area of the rotor remains constant, or by a decreasing thickness or cross-sectional area of the rotor while the eccentricity remains constant. Likewise, both the eccentricity and the cross-sectional area of the rotor can decrease in the axial direction, thereby creating a taper of the rotor, or the eccentricity and the thickness of the rotor can change inversely to each other along the central longitudinal axis. The geometric parameter can also be the same at both ends and different between the two ends of the rotor, for example, as a crowned rotor.

Due to such a geometric parameter changing along the central longitudinal axis of the rotor, the eccentrically guided rotational movement of the rotor on a circular path can change into a wobbling movement of the rotor in the stator.

The change in the geometric parameter or parameters of the rotor can be accompanied by a change in the corresponding geometric parameters of the stator in which the rotor is used. This can be done, for example, by producing the stator in a moulding process on the basis of a stator core which has been produced by the process for the rotor according to the invention. It is to be understood that the rotor itself cannot serve as a stator core for such a moulding process, due to the different geometries of the stator and the rotor, but rather a stator core can be manufactured with the method according to the invention, which is functionally suitable for a corresponding rotor and in which a corresponding change of the geometric parameter or the geometric parameters takes place.

New and improved functionalities of an eccentric screw pump can be realised through the freedom that the milling process or the additive manufacturing process opens up in the production of the rotor and a stator core. For example, when manufacturing a conical rotor, wear compensation of the stator and/or rotor can be achieved by an axial relative displacement between the rotor and stator. Furthermore, an axial displacement control or closed-loop-control can be carried out in real time during the operation of the eccentric screw pump in order to adjust the pumping action and to control or closed-loop-control the frictional torques of the pump. This can be used, for example, to reduce a starting torque of the eccentric screw pump by first setting a larger gap between the rotor and stator by axial displacement of the rotor relative to the stator, which is then reduced in the course of the starting process by axial adjustment between the rotor and stator to a smaller gap dimension or frictional contact between the rotor and stator in order to achieve the maximum pumping action without leakage losses. In addition to improving the start-up behaviour, the axial adjustment of the rotor and stator during operation of the eccentric screw pump also enables rapid changes to be made to the pumping capacity, the leakage flow and thus reactions to, for example, different viscosities, counter-pressures, and the like.

In this context, it is particularly preferred that the milling tool is guided by the electronic control during the cutting removal of the material or that the selective material application process or the selective material curing process of the additive manufacturing process is controlled in such a way that the at least one geometric parameter is continuously changed starting from the first end of the rotor to the second end of the rotor or stator core. A continuous change is understood to be a change in the geometric parameter that is continuous, i.e., does not have any discontinuous, erratic changes. Such a continuous change can be described by a mathematical formula describing the change of the geometric parameter as a function of the axial position on the rotor or by several such formulae to be applied section by section, whereby the transition between two such sections whose change is described by different mathematical formulae is continuous, i.e., is the same both with regard to the value of the geometric parameter and with regard to the rate and direction of change of the geometric parameter. Such a continuous change can, for example, lie in a rectilinear change, so that, for example, a rectilinearly conical outer envelope of the rotor is formed.

According to a further preferred embodiment, it is provided that the milling tool is guided by the electronic control system during the cutting removal of the material or that the selective material application process or the selective material curing process of the additive manufacturing process is controlled in such a way that the at least one geometric parameter is initially enlarged starting from the first end of the rotor or stator core towards the second end of the rotor or stator core and is subsequently reduced hereafter, or is initially reduced and is subsequently enlarged hereafter.

Such a change in the geometric parameter or multiple geometric parameters may result in a crowned shape with a convex outer geometry, or a concave shape with a centrally inward curved outer geometry of the rotor.

Even further, it is preferred that the milling tool is guided by the electronic control during the material removal process or that the selective material application process or the selective material curing process of the additive manufacturing process is controlled such that the at least one geometric parameter is varied from the first end of the rotor or stator core to the second end of the rotor or stator core along the entire length of the rotor or stator core or along an axial portion of the rotor or stator core with a single, double, or triple exponential dependence on the axial feed of the milling tool along the central longitudinal axis. It should be understood that mathematically free formulas can also serve as a basis for control and that mathematical approximation methods with which such geometric definitions can be approximated are understood as single, double, or triple exponential dependence.

Changing one or more geometric parameters with a single, double, or triple exponential dependence on the axial feed of the milling tool along the central longitudinal axis of the rotor has proven to be a geometric change that is advantageous for an advantageous geometry of the rotor or a model serving as a stator core that is produced with the milling process. With this geometry, control operations and wear-compensating adjustments to the rotor and/or stator relative to each other can be carried out efficiently during subsequent operation of the eccentric screw pump. In particular, several different sections of the rotor can also be altered geometrically with different single, double, or triple exponentially dependent functions.

Still further, it is preferred that the milling tool is guided by the electronic control system during the cutting removal of the material or that the selective material application process or the selective material curing process of the additive manufacturing process is controlled such that the worm of the manufactured rotor or stator core has a non-circular cross section with respect to the screw central axis, the worm of the manufactured rotor or stator core has a non-point symmetrical cross section with respect to a point of symmetry lying in the screw centre axis, at least one, preferably a plurality of, lubrication pockets are formed in the surface of the worm of the manufactured rotor or stator core, or the outer geometry of the rotor or stator core has at least one, preferably several, wear allowance sections in which the outer geometry has radially projecting sections deviating from a continuous worm outer geometry.

According to this embodiment of the process, the advantages of the milling process or the additive manufacturing process with the geometric freedoms given there are used to produce cross-sectional geometries and specific geometric irregularities on the rotor that are advantageous for the operation and the wear behaviour of the rotor. It should be understood that the changes to the rotor can be provided in such a way that they are only formed on the rotor of an eccentric screw pump or that these changes are formed on the rotor and on the stator of the eccentric screw pump, for example, by forming a corresponding stator core for use in the moulding process of the stator. The changes to the stator can be made congruent to the changes to the rotor, by which is meant a correspondingly matching change to the stator to the change to the rotor, for example, a congruent recess in the stator that matches a projection on the rotor.

The non-circular cross section may be, for example, an elliptical, triple cloverleaf, or quadruple cloverleaf cross section. The lubrication pockets in the surface of the rotor may be formed by a plurality of island-like pits, grooves extending longitudinally of the rotor or along a helix, grooves extending transversely of such longitudinal extension or helix, pocket-like recesses, and the like and serve to partially retain and insert the pumped fluid for lubrication. Wear allowance sections can also be formed by protrusions or ridges at points or extending over a shorter or longer distance and can reinforce the rotor, particularly at points of the outer geometry subject to wear, in order to extend the service life of the pump.

The rotor can also be manufactured with a toothed profile that creates optimised contact and improved touching geometry at the sealing line between the rotor and stator.

According to a further preferred embodiment, it is provided that at least two of the geometric parameters are changed along the axial feed path of the milling tool, in particular, in such a way that a first geometric parameter is increased and a second geometric parameter is increased or decreased in a proportional or exponential ratio to the increase of the first parameter, or a first geometric parameter is increased and a second geometric parameter is increased or decreased in a non-correlating ratio to the increase of the first parameter.

According to this embodiment, two or more geometric parameters are changed along the central longitudinal axis of the rotor or along the central worm axis s of the rotor, whereby this change can be made in such a way that the two or more geometric parameters are both increased or both decreased along this axial feed path or by increasing one or more geometric parameters and decreasing the other geometric parameter(s). The increase or decrease can be proportional or exponential to each other. However, the change of the two geometric parameters in relation to each other can also take place completely independently of each other, i.e., in a non-correlating relationship along the axial extension of the rotor.

Another aspect relates to a rotor for an eccentric screw pump, having a worm geometry comprising a central worm axis which spirals around a central longitudinal axis of the rotor, wherein the rotor is manufactured in a milling process in which a milling tool rotating around a tool rotation axis which is not parallel to the central longitudinal axis of the rotor is used for machining the rotor from a workpiece. This aspect of the invention relates to a rotor which is produced by a milling process and, therefore, has machining marks in the surface which are typical of a milling process. In particular, the rotor according to the invention can be manufactured according to a milling process of the type previously described. The rotor is characterised, in particular, by the fact that it does not have the machining marks in the surface or the surface structure typical of a whirling process, since it is not manufactured by a whirling process. In particular, the rotor according to the invention may have geometric properties of the rotor which cannot be produced or which cannot be produced economically by a whirling process, but which can be produced, in particular, by a milling process. These are, in particular, geometric properties and parameters of the type described above, which are produced with a process of the type described above.

The rotor for the eccentric screw pump with the worm geometry having a central worm axis that spirals about a central longitudinal axis of the rotor can be advanced alternatively or additionally to the previously described embodiment of the rotor by the rotor extending from a first end along the central longitudinal axis to a second end and the geometry of the rotor being a worm geometry defined by the geometric parameters: Eccentricity of the worm thread, defined as the distance between a central worm axis running in the centre of the worm cross-sectional area and the centre longitudinal axis; enveloping the outer diameter of the worm in relation to the central longitudinal axis; enveloping the inner diameter of the worm in relation to the central longitudinal axis; outer diameter of the worm in relation to the central worm axis, and the pitch of the central worm axis, wherein at least one of the geometric parameters changes in the axial direction along the central longitudinal axis of the rotor, in particular, is greater at the first end of the rotor than at the second end of the rotor, or at one end of the rotor is different from a cross section of the rotor lying in the axial direction between the first and second ends.

According to this embodiment, one or more geometric parameters are changed along the central longitudinal axis of the rotor, which is possible in an economically efficient manner, in particular, by using a milling process to manufacture the rotor. For the modification possibilities and associated functions of the geometric parameters, reference is made to the preceding description of the corresponding manufacturing process.

It is even more preferred if the at least one geometric parameter is changed continuously, in particular, continuously towards the second end of the rotor, starting from the first end of the rotor.

Furthermore, it is preferred if the at least one geometric parameter is first increased from the first end of the rotor towards the second end of the rotor and then decreased therefrom, or first decreased and then increased therefrom.

The rotor may be further improved by varying the at least one geometric parameter from the first end of the rotor to the second end of the rotor along the entire length of the rotor or along an axial portion of the rotor with a single, double, or triple exponential dependence on the axial advance of the milling tool along the central longitudinal axis.

The rotor may be further improved in that the worm of the manufactured rotor has a non-circular cross section with respect to the central worm axis, the worm of the manufactured rotor has a non-point symmetrical cross section with respect to a point of symmetry lying in the central worm axis, at least one, preferably a plurality of, lubrication pockets are formed in the surface of the worm of the manufactured rotor, the outer geometry of the rotor has at least one, preferably a plurality of, wear allowance sections in which the outer geometry has axially projecting sections deviating from a continuous worm outer geometry. In particular, the non-circular cross section may hereby be characterised to be non-circular in deviation from a reference profile, as previously described.

Still further, it is preferred that at least two of the geometric parameters are changed along the axial advance path of the milling tool, in particular, in such a way that a first geometric parameter is increased and a second geometric parameter is increased or decreased in a proportional or exponential relationship to the increase of the first parameter, or a first geometric parameter is increased and a second geometric parameter is increased or decreased in a non-correlating relationship to the increase of the first parameter.

With regard to the above-mentioned options for the further improvement of the rotor according to the invention, reference is made to the above explanations on the further improvement of the manufacturing process according to the invention for a rotor deviating from the reference profile.

Another aspect of the invention is a stator for an eccentric screw pump comprising a stator cavity having a geometry of a rotor of the type previously described. According to this embodiment, a rotor formed or manufactured according to any of the foregoing aspects or any of the foregoing embodiments is used as a core for a stator. The outer geometry of the rotor used as the stator core therefore dictates the inner geometry of the stator. In this context, it is to be understood in principle that the stator can have an internal geometry which is modified, in particular, according to the geometry and the possibilities of changing one or more geometric parameters along the central longitudinal axis of the geometry-defining rotor (stator core).

A still further aspect of the invention is a use of a rotor of the type previously described, or a rotor produced by a manufacturing process previously described, as a stator core for producing a stator in a master moulding process. According to this embodiment, the rotor of the previously described type or a rotor manufactured by a previously described manufacturing method is used as a stator core in a moulding process. In particular, this may involve moulding an elastomer around the stator core to form an elastomer insert of a stator.

The invention further relates to an eccentric screw pump comprising a rotor of the type described above and/or a stator of the type described above. According to the invention, the stator can be manufactured, in particular, using a rotor of the type described above in a moulding process by using the rotor as a stator core. In principle, it is to be understood that the rotor used as stator core and the rotor of the eccentric screw pump used as rotor are geometrically differently designed, for example, differently designed in pitch and cross section to the rotor, in order to establish the functionality of the eccentric screw pump. Furthermore, it is to be understood that both the rotor and the stator or one of both can be further formed according to the previously described embodiments, in particular, may have a change in one or more geometric parameters along the central longitudinal axis.

In particular, the eccentric screw pump may be advanced by having the at least one geometric parameter of the rotor varying in a direction along the central longitudinal axis of the rotor and the at least one geometric parameter of the stator varying along a central longitudinal axis of the stator be coincident geometric parameters. According to this embodiment, matching parameters on the rotor and stator, or on the rotor serving as the stator core, are changed along the central longitudinal axis of the stator to thereby achieve interaction and functional effect through this or these changed geometric parameters. The change of the corresponding parameters can follow the same or different mathematical specifications.

Even further, it is preferred that the at least one geometric parameter of the rotor and the at least one geometric parameter of the stator change synchronously in one direction along the central longitudinal axis. Such a synchronous change achieves a functionally advantageous congruence in which one or more matching geometric parameters are changed synchronously in the same direction along the central longitudinal axis in both the rotor and the stator. Hereby, for example, a conical rotor can be used in a conical stator, and a wear adjustment or a temporarily temporally desired leakage can be produced by axial displacement.

BRIEF DESCRIPTION OF THE DRAWINGS

Preferred embodiments of the invention are explained with reference to the accompanying Figures, wherein.

DETAILED DESCRIPTION OF THE EMBODIMENTS

Figure 1:
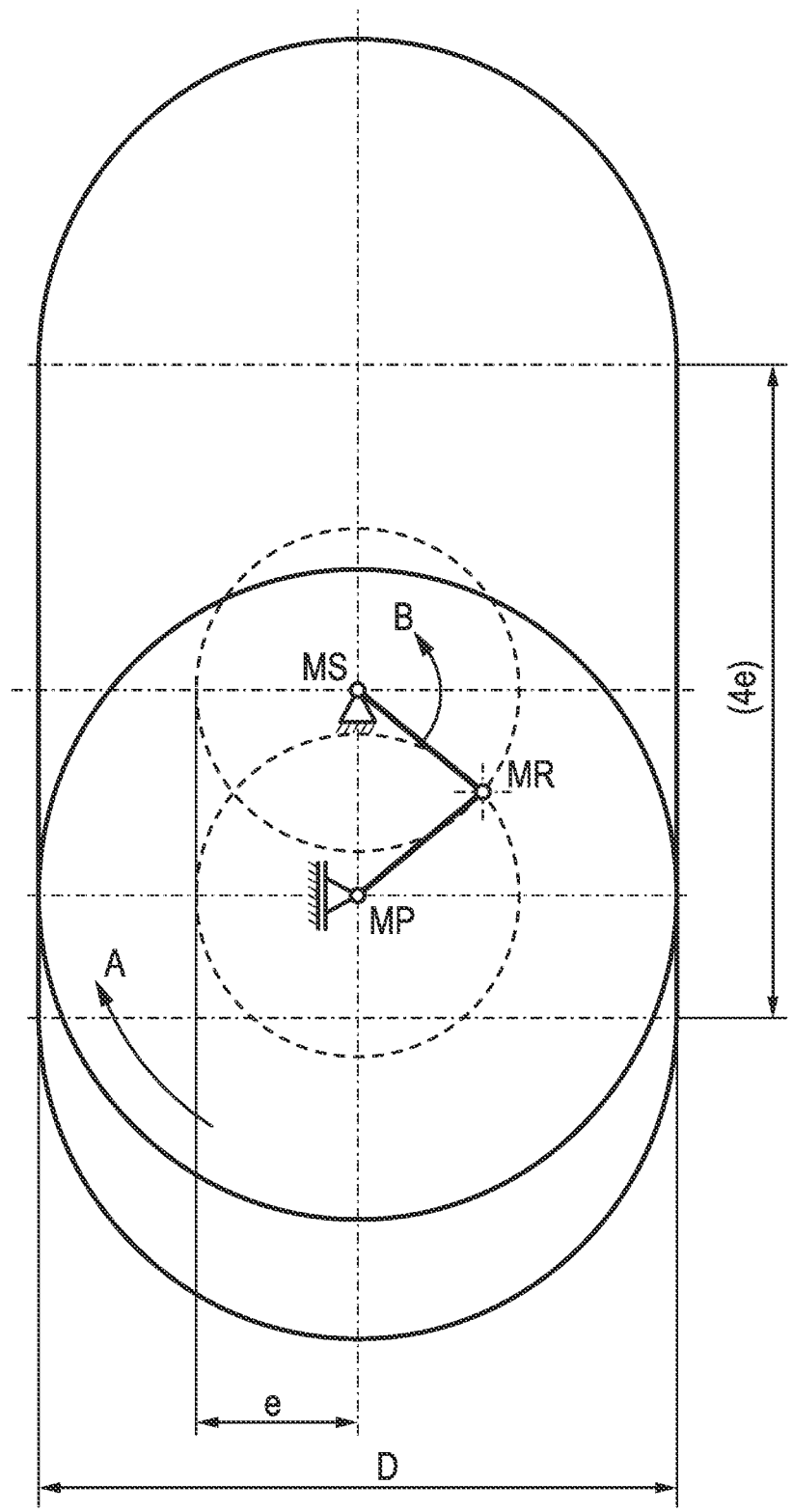
FIG. 1 shows a schematic cross-sectional view of the geometric conditions of a reference profile of a rotor of a previously known eccentric screw pump.

Referring first to FIG. 1, the eccentric rotary motion of a rotor in a stator is subject to geometric boundary conditions determined by the diameter of the rotor profile and the eccentricity between the central longitudinal axis MS of the stator and the central longitudinal axis MR of the rotor. As designated in the Figure:

D=Diameter of the rotor profile
e=eccentricity
MS=centre of the central axis of the stator (central axis is perpendicular to drawing plane)
MR=centre of the central axis of the rotor (central axis is perpendicular to drawing plane)
MP=centre of the rotor profile
A=Driven direction of rotation of the rotor
B=Resulting direction of rotation of the rotor centre due to worm shape It is to be understood that the rotor is driven around the axis MR by the wobble shaft and that this causes a rotation around the axis MP.

Figure 2:
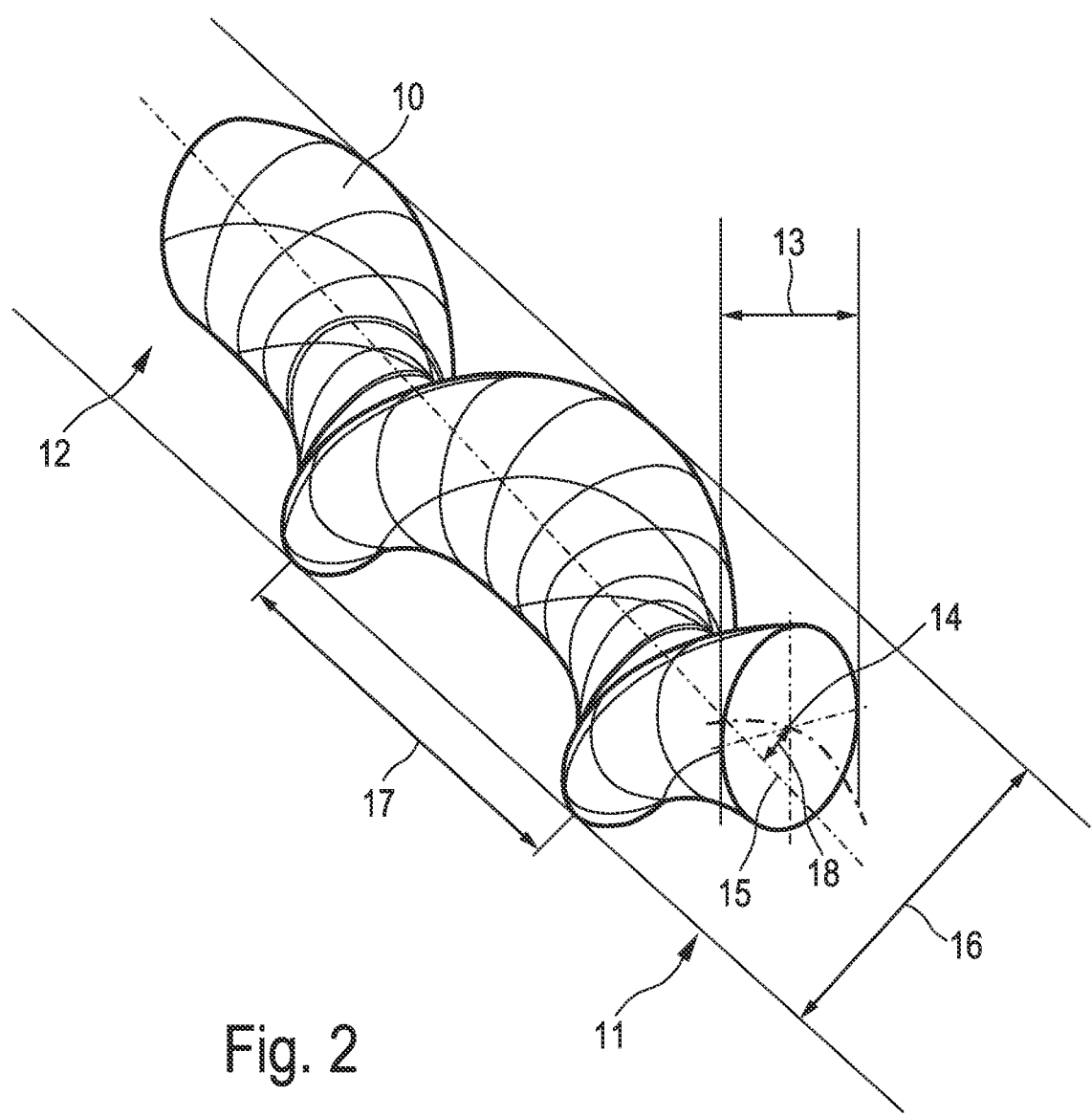
FIG. 2 shows a schematic perspective view of a rotor manufactured according to the method of the invention or of a rotor according to the invention.

FIG. 2 shows a rotor 10 for an eccentric screw pump. The rotor extends along a central longitudinal axis 15 from a first end 11 to a second end 12. The rotor 10 is designed as a worm with a worm central axis 14 winding helically around the central longitudinal axis 15. The worm central axis 14 is offset from the central longitudinal axis 15 by an eccentricity 18 in the front cross section at the first end 11. In the rotor 10 shown, this eccentricity remains constant over the entire axial length from the first end 11 to the second end 12.

The rotor 10 has an elliptical cross-sectional geometry 13 at the first end 11 and is characterised by an outer envelope 16 which is elliptical in cross section. The outer envelope 16 is an elliptical body with the central longitudinal axis 15. The rotor has a pitch 17.

Figure 3:
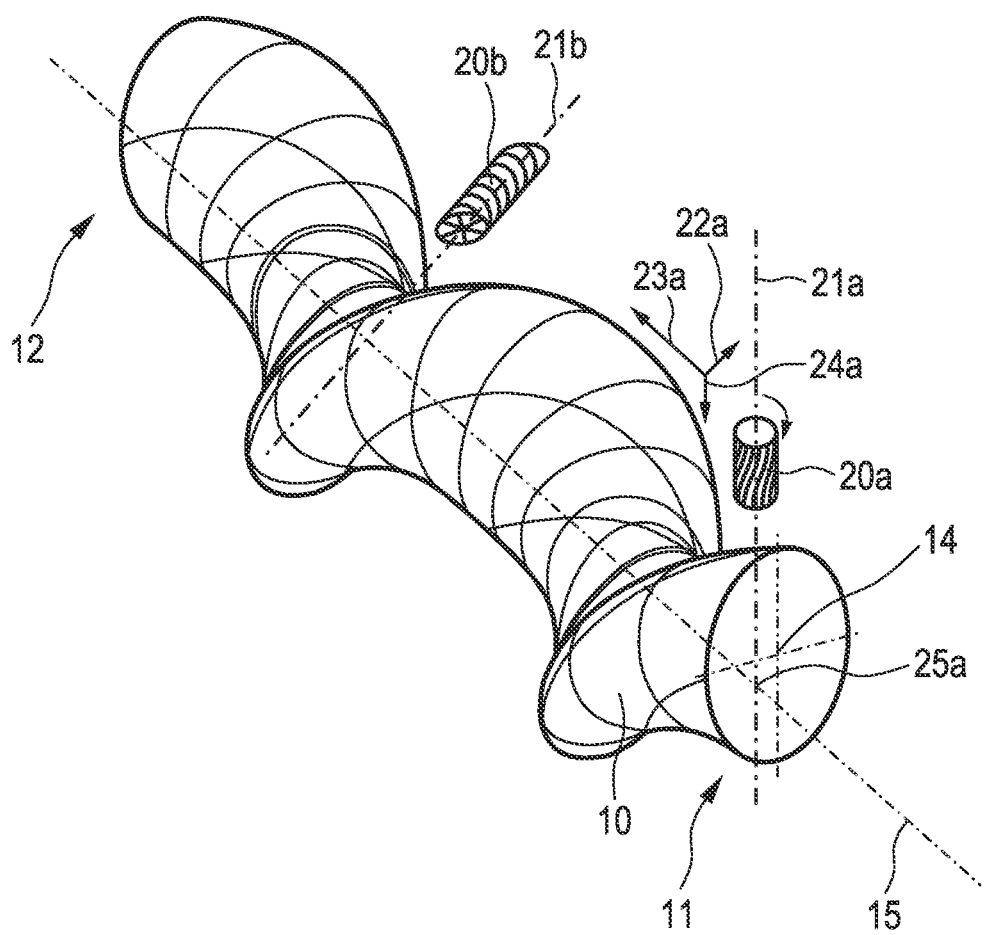
FIG. 3 shows a schematic representation of the manufacturing process in two variants, as shown in FIG. 1.

With reference to FIG. 3, the rotor according to the invention is shown with the milling tools and movements of the milling tools necessary for its manufacture. As can be seen, according to a first variant of manufacture, the rotor 10 can be manufactured with a milling tool 20a, which rotates about a tool rotation axis 21a and thereby executes the cutting movement. The tool rotation axis 21a is perpendicular to the central longitudinal axis 15. The tool rotation axis 21a is radial to the central longitudinal axis 15 and intersects this central longitudinal axis 15 at an intersection point 25a. The tool 20a can be infed in a first infeed motion in a direction 24a that is parallel to a radial direction with respect to the centre longitudinal axis 15. Further, the milling tool 20a can be advanced in an axial direction 23a that is parallel to the longitudinal centre axis 15. Finally, the milling tool 20a can also be infed in a direction 22a that is parallel to a radial direction and perpendicular to the direction 24a. An infeed in the direction of the axes 22a and 24a causes a machining of the rotor 10, which causes a change in the extension in the radial direction of the rotor 10. An advancing along the advancing axis 23a produces a constant radius along the direction of the central longitudinal axis 15.

Alternatively, the rotor 10 can be machined with a milling tool 20b that rotates about a tool rotation axis 21b to produce the cutting action. In this case, the tool rotation axis 21b is also parallel to a radial direction with respect to the central longitudinal axis 15, but runs offset to the central longitudinal axis 15 and does not intersect it.

In such a variant, the peripheral cutting edges, preferably only the peripheral cutting edges, of the milling tool 20b can be used. The milling tool 20b is preferably guided tangentially to the desired contour.

During the manufacturing process, the rotor 10 can be rotated around the central longitudinal axis 15 in order to achieve machining on all sides. This rotation around the central longitudinal axis 15 is synchronised with an infeed movement of the milling tool 20a or the milling tool 20b along the infeed axes 22a, 24a and the advancing axis 23a.

By superimposing the movements in this way, it is possible to create the shape only by superimposing the movements, but without specifying individual surface points, line, or surface elements for this in a CAD programme. Instead, direct production is possible. Neither the use of further software, such as CAM programmes, 3D models, or individual milling programmes, are necessary. The system limit of the machine with control is not exceeded by any data format.

The geometry of the rotor 10 preferably has a tangentially continuous, preferably curvilinear, surface. By laterally traversing this surface tangentially, the pitch component of the spiral can be compensated for, such that a milling tool effectively cuts only in the plane (only lateral milling and no "plunging" or "climbing"). It is thus possible to cut only with the peripheral cutting edges of the cylindrical milling tool (and not with the face). This means that both the widely used face milling cutters and circumferential end milling cutters can be used. Since circumferential end milling cutters only have cutting edges on the circumference, these tools are more cost-effective than face milling cutters. Furthermore, tool wear is lower on the periphery than on the face, as the cutting edges can be designed more firmly (due to larger installation space). Furthermore, greater feed rates can be realised on the circumference than on the face, as the cutting speed on the lateral surface of a cylinder is constant (with face milling cutters, the cutting speed approaches zero at constant speed in the centre of the tool). The minimisation of tool costs and the use of larger possible feeds are advantages of the method described here compared to conventional CAM methods.

In contrast to conventional CAM/3D-CAM methods, in which the surface of a 3D body is scanned in the mould by a CAM programme and a milling path is calculated from the points found, which approximates the surface with a defined error, a different strategy is followed in the method described here. The movement path of the milling tool is described by formula and/or parametrically. This allows the milling tool to be moved specifically (tangentially) past the workpiece so that the desired surface results.

Preferably, all corrections and/or the path distribution are calculated currently in the process and during machining. This makes it possible to use different cylindrical tools for machining. After a tool breakage, for example, machining can be continued with a tool of the same or different type (for example, continuing with a different tool diameter is possible).

Figure 4:
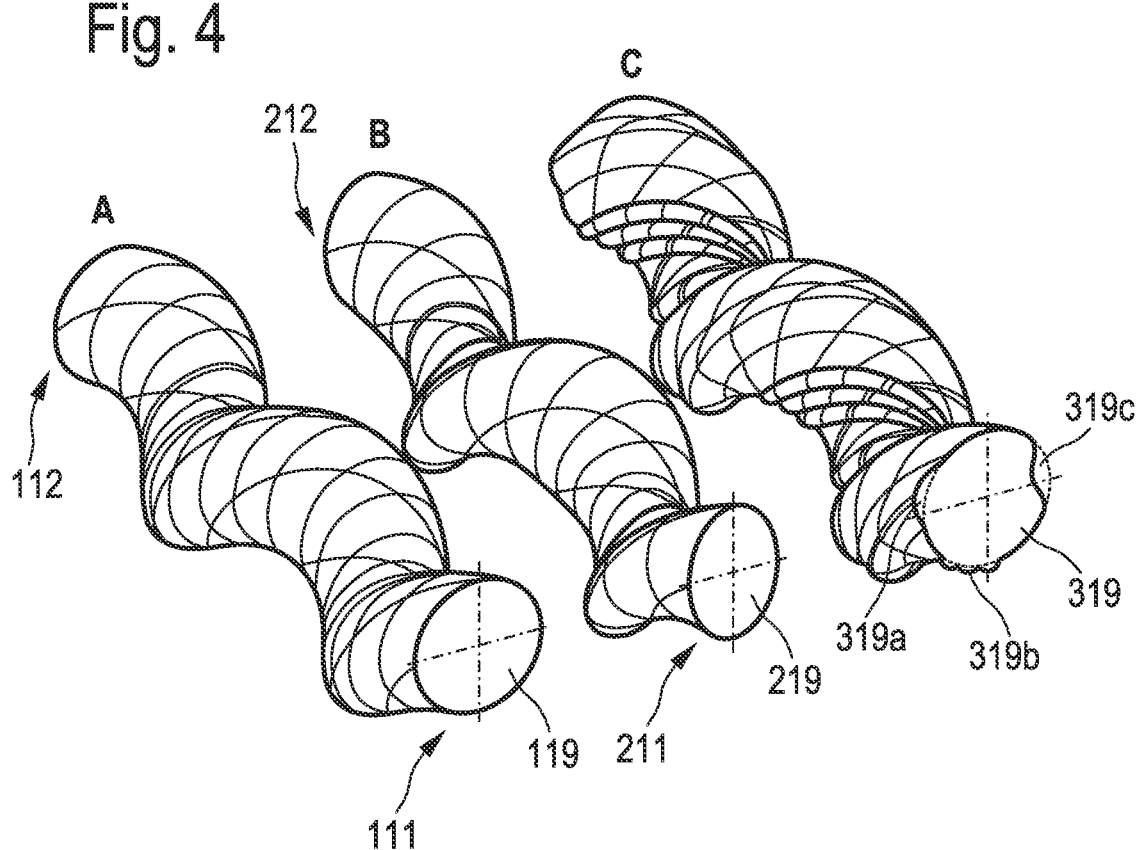
FIG. 4 shows a schematic representation of three rotors A, B, C, which are designed or manufactured according to the invention.

With reference to FIG. 4, three rotors A, B, C manufactured by the method according to the invention or three embodiments of the rotor according to the invention are illustrated. In the rotor according to rotor A of FIG. 4, the cross-sectional area 119 is circular in shape and this circular cross section produced thereby extends from the first end 111 to the second end 112 of the rotor A.

The rotor B shown in FIG. 4 is a milled rotor with an elliptical geometry, in which the rotor has an elliptical cross section that remains geometrically constant from the front end 211 to the rear end 212 and has a uniform eccentricity to the central longitudinal axis.

The rotor C shown in FIG. 4 has a circular cross-sectional surface contour that has three geometric features. Firstly, a rounded elevation 319a is formed on one side of the cross-sectional surface, which extends along the entire rotor around the circumference of the worm. Offset by approximately 90 degrees from this protrusion 319a, three smaller rounded protrusions 319b are formed side by side on the outer circumference, also extending helically along the entire worm. Finally, approximately opposite to the elevation 319a, a rounded recess 319c is formed on the cross section, which also extends helically along the entire worm. The characteristics of the features are shown to be constant, but can be varied as desired.

Figure 5:
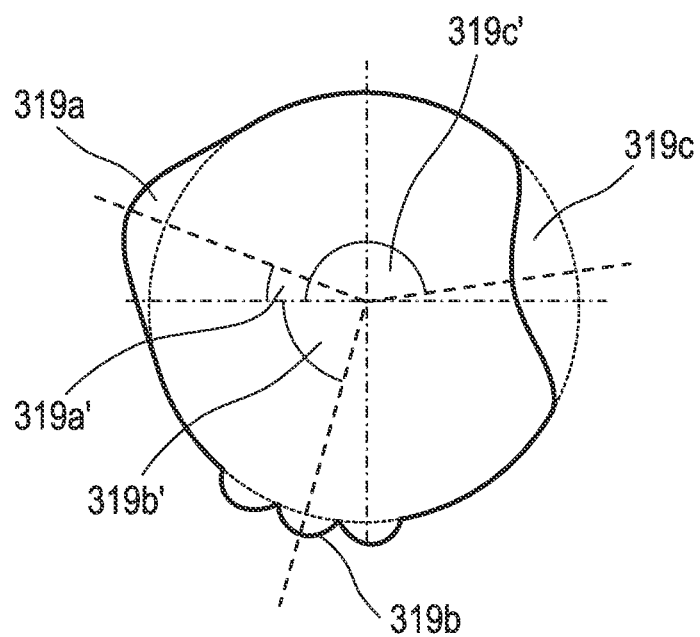
FIG. 5 shows a cross-sectional view of a rotor with geometric features formed or produced thereon according to the invention.

FIG. 5 shows the cross-sectional geometry of the rotor according to rotor C shown in FIG. 4 in greater detail. As can be seen, the elevations 319a, the triple elevation 319b and the recess 319c lie at defined angles 319a', 319b' and 319c' to the cross-sectional axes of the cross-sectional area. These angles are predetermined and defined for optimal wear prevention.

Figure 6:
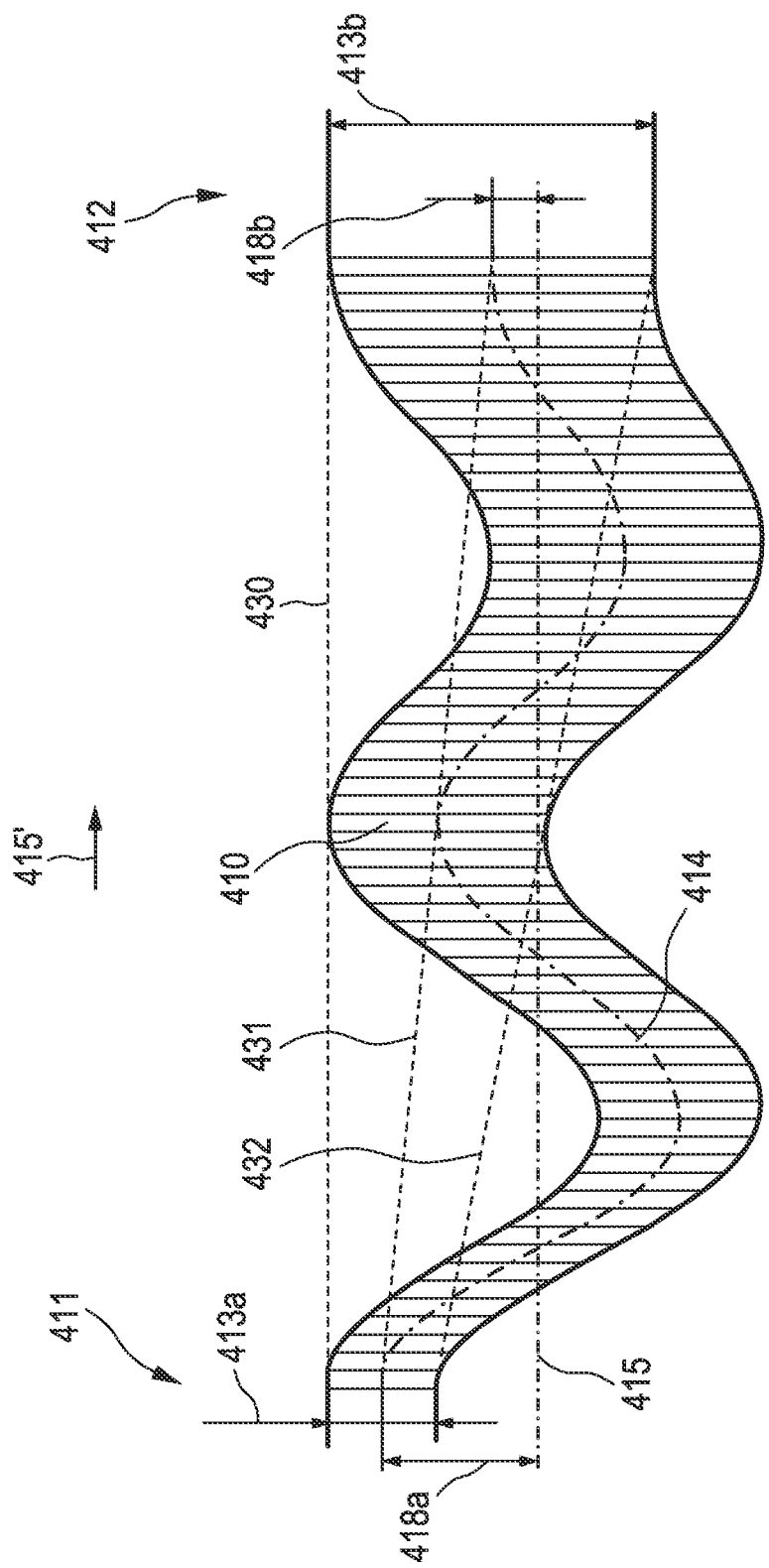
FIG. 6 shows a side view of a rotor according to an embodiment according to the invention or according to the manufacturing process according to the invention.

FIG. 6 shows another embodiment of a rotor 410 extending from a first end 411 to a second end 412 along a central longitudinal axis 415. As can be seen, at the first end 411 the rotor has an eccentricity 418a of the central worm axis 414 relative to the central longitudinal axis 415, which decreases in an axial direction 415' along the central longitudinal axis 415 to a smaller eccentricity 418b at the second end 412.

As can further be seen, the rotor 410 has a cross-sectional diameter 413a at the first end 411 which increases in axial direction 415' along the central longitudinal axis 415 to a cross-sectional diameter 413b at the second end 412.

The reduction in eccentricity 418a, 418b along the central longitudinal axis 415 and the increase in cross-sectional diameter 413a, 413b along the central longitudinal axis 415 are constant in the axial direction and in a simple potential dependence on the axial position along the central longitudinal axis 415. The reduction in eccentricity and the increase in cross-sectional diameter are inversely related. The reduction and enlargement are chosen such that an outer envelope 430 of the rotor results in a cylindrical body around the central longitudinal axis 415.

In contrast, a virtual envelope 431 of the central worm axis 414 extends conically from the first end 411 to the second end 412. A virtual envelope 432 of the cross-sectional edge of the worm facing the central longitudinal axis 415 initially decreases to a radius=0 starting from the first end 411 to approximately the centre of the rotor between the first end 411 and the second end 412 and increases again starting from this centre to the second end 412 of the rotor.

In principle, it should be understood that a rotor illustrated in FIGS. 1 to 6 can be used as a rotor for an eccentric screw pump in all embodiments. However, the body illustrated in FIGS. 1 to 6 can as well be used as a stator core for manufacturing a stator, in particular, for manufacturing a stator using this stator core in a moulding process. It is to be understood that such a stator manufactured with the body according to FIGS. 1 to 6 cannot be operated with a rotor according to FIGS. 1 to 6, since the number of threads of the stator in an eccentric screw pump is greater than that of the rotor.

Figure 7:
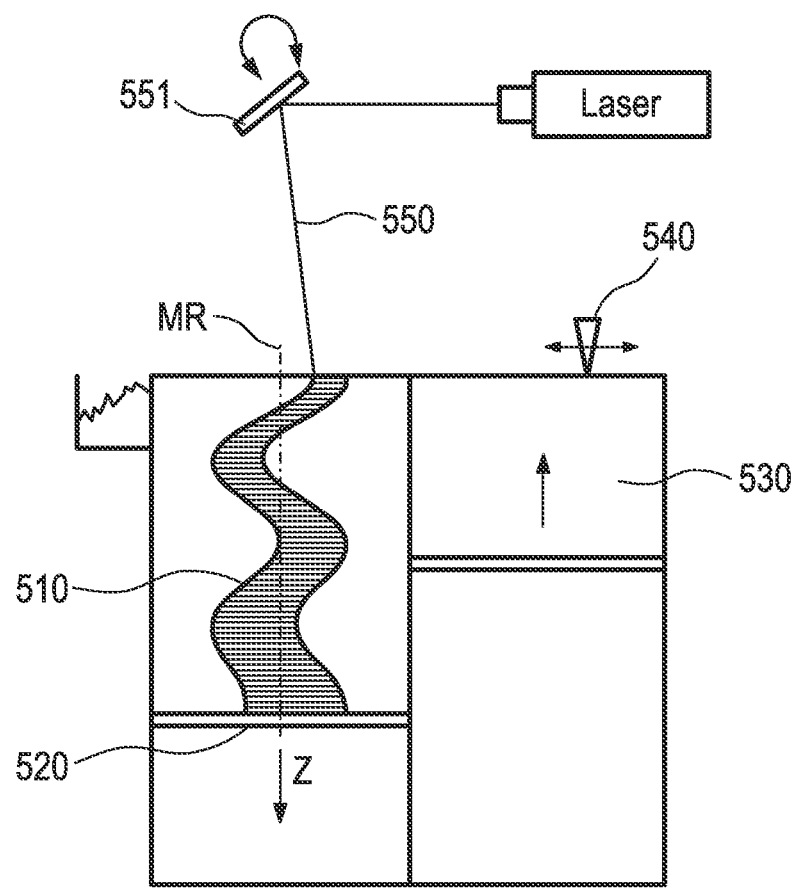
FIG. 7 shows a schematic view of an additive manufacturing process of a rotor according to the invention.

FIG. 7 shows a functional principle of manufacturing a rotor in an SLS/SLM process. The rotor 510 is built up in layers on a vertically displaceable building platform 520, whereby the layer plane is perpendicular to the central longitudinal axis of the rotor. From a powder reservoir 530, a thin layer of a powder material is repeatedly applied over a previously selectively cured layer by means of a doctor blade 540. This newly applied layer is then selectively cured in those areas corresponding to the cross-sectional geometry of the rotor 510 in that layer by exposure to a laser beam 550. For this purpose, the laser beam 550 is directed by means of a controllably adjustable deflection device 551 onto these areas of the layer to be selectively cured.

Curing is done by melting the powder material and simultaneously bonding the powder material of the layer to the previously selectively cured areas of the underlying layer. After this is done, the build platform is lowered by a layer thickness, a new layer is applied, and this layer is again selectively cured as previously described. The thickness of a single layer can be in the range of 50-200 m. The powder material can be a metallic alloy with a grain size in the range between 5-100 m.

The rotor produced in the additive manufacturing process regularly has the outer geometries and inner microstructures produced by the layer-by-layer manufacturing process. These are often sufficient for the tolerances and sealing requirements of an eccentric screw pump. However, the surface can be smoothed with a geometrically defined or geometrically undefined machining process (e.g., by means of electropolishing) if necessary.

Preferably, the manufactured rotor is hollow inside or at least has an inner cavity. For rotors for small eccentric screw pumps, an additive manufacturing process is preferable in which a plastic material is processed, for example a 3D printing process or a stereolithography process.

The invention claimed is:
1. A method of manufacturing a metallic rotor of an eccentric screw pump, comprising the steps of:
   clamping a workpiece extending along a central longitudinal axis in a workpiece clamping device; and
   removing material from the workpiece with a cutting tool to produce an outer surface geometry of the rotor;

wherein the cutting tool is advanced along an axis of advance that is parallel to the central longitudinal axis of the workpiece, and the cutting tool rotates around a tool rotation axis to produce the cutting action, wherein the tool rotation axis is parallel to the central longitudinal axis of the workpiece and runs offset to the central longitudinal axis of the workpiece and does not intersect it; and wherein the outer surface of the rotor is not produced in a three-axis whirling process.

* * * * *